United States Patent [19]

Muramatsu

[11] Patent Number: 5,319,769
[45] Date of Patent: Jun. 7, 1994

[54] MEMORY ACCESS CIRCUIT FOR HANDLING DATA POCKETS INCLUDING DATA HAVING MISALIGNED ADDRESSES AND DIFFERENT WIDTHS

[75] Inventor: Tsuyoshi Muramatsu, Kashiwa, Japan

[73] Assignee: Sharp Kabushiki Kaisha, Osaka, Japan

[21] Appl. No.: 580,829

[22] Filed: Sep. 11, 1990

[30] Foreign Application Priority Data

Sep. 11, 1989 [JP] Japan .................. 1-235433
Oct. 11, 1989 [JP] Japan .................. 1-264680

[51] Int. Cl.⁵ .................................. G06F 12/04
[52] U.S. Cl. .................................. 395/425; 395/800;
364/DIG. 2; 364/244.4; 364/244.5; 364/245.1;
364/245; 364/252.6; 364/252.3
[58] Field of Search ........ 395/325, 500, 800, 425

[56] References Cited

U.S. PATENT DOCUMENTS

| | | | |
|---|---|---|---|
| 3,739,352 | 6/1973 | Packard .................. | 395/425 |
| 4,138,720 | 2/1979 | Chu et al. ............... | 395/400 |
| 4,315,312 | 2/1982 | Schmidt .................. | 395/425 |
| 4,654,781 | 3/1987 | Schwartz et al. ....... | 395/425 |
| 4,654,787 | 3/1987 | Finnell et al. .......... | 395/425 |
| 4,814,976 | 3/1989 | Hansen et al. .......... | 395/375 |
| 4,860,198 | 8/1989 | Takenaka ................ | 395/325 |
| 4,992,931 | 2/1991 | Hirasawa ................. | 395/500 |
| 5,073,969 | 12/1991 | Shoemaker .............. | 395/725 |

OTHER PUBLICATIONS

MC68020 32 Bit Microprocessor User's Manual, Motorola Inc., pp. 7-5-7-22 No Date.

Primary Examiner—Parshotam S. Lall
Assistant Examiner—Krisna Lim
Attorney, Agent, or Firm—David G. Conlin; Robert F. O'Connell

[57] ABSTRACT

A data sizing circuit in a data flow type system is disclosed. A copy is made of the data included in a packet. The original first data of M×N bits is circulated by N-bit unit, where only the required bits are selectively written into the memory and read out. M (M is integer) is added to the address corresponding to the copied second data, and data of M×N bits is circulated by N-bit unit, where only the required bits are selectively written into the memory and read out. The first and second data read out from the memory are synthesized, circulated by N-bit unit, and output. Data of plural types with different data width can be read/written into an arbitrary address without wasting memory.

7 Claims, 14 Drawing Sheets

VALUE OF LESS
SIGNIFICANT
2 BITS

(a) TO PULSE INPUT LINE 131

(b) TO REGISTER 111

(c) TO CONTROL CIRCUIT 102

(d) PACKET IDENTIFICATION FLAG (e) MORE SIGNIFICANT ADDRESS (OUTPUT OF REGISTER 111)

(f) MORE SIGNIFICANT ADDRESS (OUTPUT OF INCREMENTOR 122)

(g) TO REGISTER 112

(h) TO REGISTER 113

(i) TO CONTROL CIRCUIT 103

(j) TO REGISTER 114

(k) CONTENTS OF REGISTER 112

(l) CONTENTS OF REGISTER 113

(m) CONTENTS OF REGISTER 114

MEMORY ACCESS CIRCUIT FOR HANDLING DATA POCKETS INCLUDING DATA HAVING MISALIGNED ADDRESSES AND DIFFERENT WIDTHS

BACKGROUND OF THE INVENTION

1. Field of the Invention

The present invention relates to data sizing circuits in data flow type systems. More particularly, the present invention relates to a data sizing circuit in a data flow type system where a packet including an address signal, data, and a flag specifying read/write is passed in synchronism with a pulse signal so that data processing is carried out associated with the passing of the packet.

2. Description of the Related Art

FIG. 1 is a block diagram showing an example of a conventional data sizing circuit in a data flow type system. Referring to FIG. 1, a conventional data sizing circuit will be described. A data sizing circuit comprises transfer control circuits 201, 202, pipeline registers 203, 204, a memory 205, and an address decoder 206. A packet input line 212 is connected to pipeline register 203. A packet including data and address signals required for memory access and a read/write flag specifying the read/write is applied to packet input line 212, which is a parallel bit train propagated in synchronism with a pulse. The write data provided from pipeline register 203 is applied to memory 205 via data line 221. The read/write flag is applied to memory 205 via read/write flag line 222. A portion of the address signal provided from pipeline register 203 is directly applied to memory 205 via address line 223, as well as to address decoder 206 via address line 225. The output of address decoder 206 is applied to memory 205 via chip enable line 227 as a chip enable signal.

A portion of the packet which does not have its contents changed by memory access provided from pipeline register 203 is applied to a pipeline register 204 at a succeeding stage via packet transfer line 224. The data read out from memory 205 is applied to pipeline register 204 via read data line 226. A packet output line 214 is connected to the output of pipe line register 204.

A pulse input line 211 is connected to transfer control circuit 201. When a pulse signal is applied to pulse input line 211, transfer control circuit 201 applies a write pulse signal to pipeline register 203 immediately, and a pulse signal to transfer control circuit 202 after a predetermined time of delay. When a pulse signal is applied, transfer control circuit 202 supplies a write pulse signal to pipeline register 204 immediately, and a pulse signal to pulse output line 213 after a predetermined time of delay. Pipeline registers 203 and 204 fetch the data on the input line and hold the same while providing the same simultaneously, when a write pulse signal is applied.

When the read/write flag provided to read/write flag line 222 is set to a read value, and the chip enable signal provided from address decoder 206 is at an active state, memory 205 carries out reading operation to provide the data whose address is specified by the address signal applied from the address line 223 to read data line 226. When the read/write flag provided from read/write flag line 226 is set to a write value, and the chip enable signal provided from address decoder 206 is at an active state, memory 205 carries out writing operation to write the write data provided to write data line 221 to the address specified by the address signal provided from address line 223. The data provided to read data line 226 has the same value of the data in write data line 221, regardless of the state of the chip enable signal.

When the chip enable signal is not active, memory 205 attains a non-selected state, regardless of the signal state of other input lines, to hold the stored contents.

In accordance with the above described structure, the operation of reading from memory 205 is described hereinafter. A packet with a read value set in the read/write flag is applied to packet input line 212, and a pulse signal is applied to pulse input line 211. Transfer control circuit 201 applies a write pulse signal to pipeline register 203. Pipeline register 203 fetches and holds the packet provided from packet input line 212 in response to the write pulse signal. Then, transfer control circuit 201 provides a pulse signal to transfer control circuit 202 after a predetermined time. Meanwhile, the read/write flag provided from read/write flag line 222, the address signal applied from address line 223, and the write data applied from write data line 221 are available as the packet for memory 205 to carry out reading operation, to provide the data read out to read data line 226.

When a pulse signal is applied from transfer control circuit 201 to transfer control circuit 202, transfer control circuit 202 applies a write pulse signal to pipeline register 204. The data provided from read data line 226 and packet transfer line 224 are fetched and held in pipeline register 204, to be provided from packet output line 214. After a predetermined time, transfer control circuit 202 provides a pulse signal to pulse output line 213. Thus, a series of read processing is carried out. In the case of writing to memory 205, the read/write flag of the packet applied to packet input line 212 is set to a write value, whereby a writing process similar to the above mentioned serial read processing is carried out.

The conventional data sizing circuit of FIG. 1 has the following inconveniences. For the sake of explanation, it is presumed that data width is 32 bits, that is to say, each width of write data line 221 and read data line 226 is of a system of 32 bits. In this case, the read/write of the system is carried out at one time all in 32 bits width. Therefore, in write operation, data of 8 bits in width, for example, can not be used because the contents of the remaining 24 bits are destroyed at the time of writing data of 8 bits in width. Only the less significant 8 bits, for example, out of the 32 bits can be handled as being valid during processing of 8-bit wide data. That is to say, although 8 bits of data are valid and can be used even if the data region is 32 bits, the remaining 24 bits will be wasted entirely, to degrade the usage efficiency of memory 205.

The unit of the address in the system is automatically established to 32 bits. Assuming that the unit of the address is 8 bits in a 32-bit wide data, the location of a data whose address is 1 for example (8-bit unit) lies over two words of 32 bits in width, requiring access to two addresses. Therefore, handling will not be possible in the example of FIG. 1. In the case where such a processing of impossible handling is removed, the positioning of data will be limited to be carried out under a multiple of 4 when an address unit of 8 bits for example is to be used, because the address unit of word is 32 bits in the system.

When a write packet is applied to pipeline register 203 as the first packet, the above mentioned serial writing processing is carried out. When a pulse signal is provided from transfer control circuit 202 to pulse output line 213, the data sizing circuit returns to a waiting state. At this time, pipeline register 203 holds the contents of the first packet and continues to apply the data thereof to memory 205. In other words, the data sizing circuit is in a waiting state with a write flag applied from read/write flag line 222 to memory 205 and with a chip enable signal of an active state applied from chip enable line 227 to memory 205.

Under this state, a write packet with only the address signal provided to memory 205 via address line 223 differing from that of the first packet is applied as the second packet. Attention is directed to the change in the output data when the contents held in pipeline register 203 is updated to the contents of the second packet in response to the pulse signal applied from transfer control circuit 201. The read/write flag remains at a write value in this case. The chip enable signal also remains at an active state. In other words, when seen from the memory 205 side, the read/write flag and the chip enable signal remain stabilized in a write state and active state, respectively, with only the address signal changed. This provokes the problem of erroneous writing or destruction of the stored data, in view of the operational characteristic of memory 205 and whether all bits in address line 223 are actually altered simultaneously.

FIG. 2 shows the address signal applied to address line 223, the read/write flag provided from read/write flag line 222, and the chip enable signal provided from chip enable line 227. The above mentioned problems occur at time point $t_0$ where only the address signal changes.

SUMMARY OF THE INVENTION

In view of the foregoing, a main object of the present invention is to provide a data sizing circuit in a data flow type system where read/write of a plurality of different data types with different data widths are allowed regarding an arbitrary address without wasting memory.

Another object of the present invention is to provide a data sizing circuit in a data flow type system that can carry out stabilized writing.

In summary, the present invention is a data sizing circuit in a data flow type system with a packet comprising an address signal of N-bit unit, data having a width of M×N bits (M, N are integers), and a flag specifying read/write passed in synchronism with a pulse signal, where data processing is carried out according to the propagation of the packet. Two packets are made of identical contents, where M is added by an incrementor to the address corresponding to the packet of either of the two copied packets to specify the address of the memory. Both of the copied data of M×N bits are circulated by an input swapper in N-bit unit to be applied to the memory. The memory has an arbitrary depth with M memory cells of N bits in width that can be accessed anytime. The access of each of M memory cells is detected by an access detecting circuit, whereby the memory is enabled in response to the detection of a memory to be accessed. Then the two data copied, written into the memory, and read out are synthesized and output.

In accordance with the present invention, M types of data with N bits in width to M×N bits in width can be read/written regarding an arbitrary address in a data flow type system of M×N bits data line width with an address space in N-bit unit. Therefore, limitation in usage such as the data width must be in the unit of M×N bits, or such as the address must also be in the unit of M×N bits can be eliminated.

The foregoing and other object, features, aspects and advantages of the present invention will become more apparent from the following detailed description of the present invention when taken in conjunction with the accompanying drawings.

BRIEF DESCRIPTION OF THE DRAWINGS

FIG. 7 is a timing chart for explaining the operation of one embodiment of the present invention.

DESCRIPTION OF THE PREFERRED EMBODIMENTS

Figure 3:
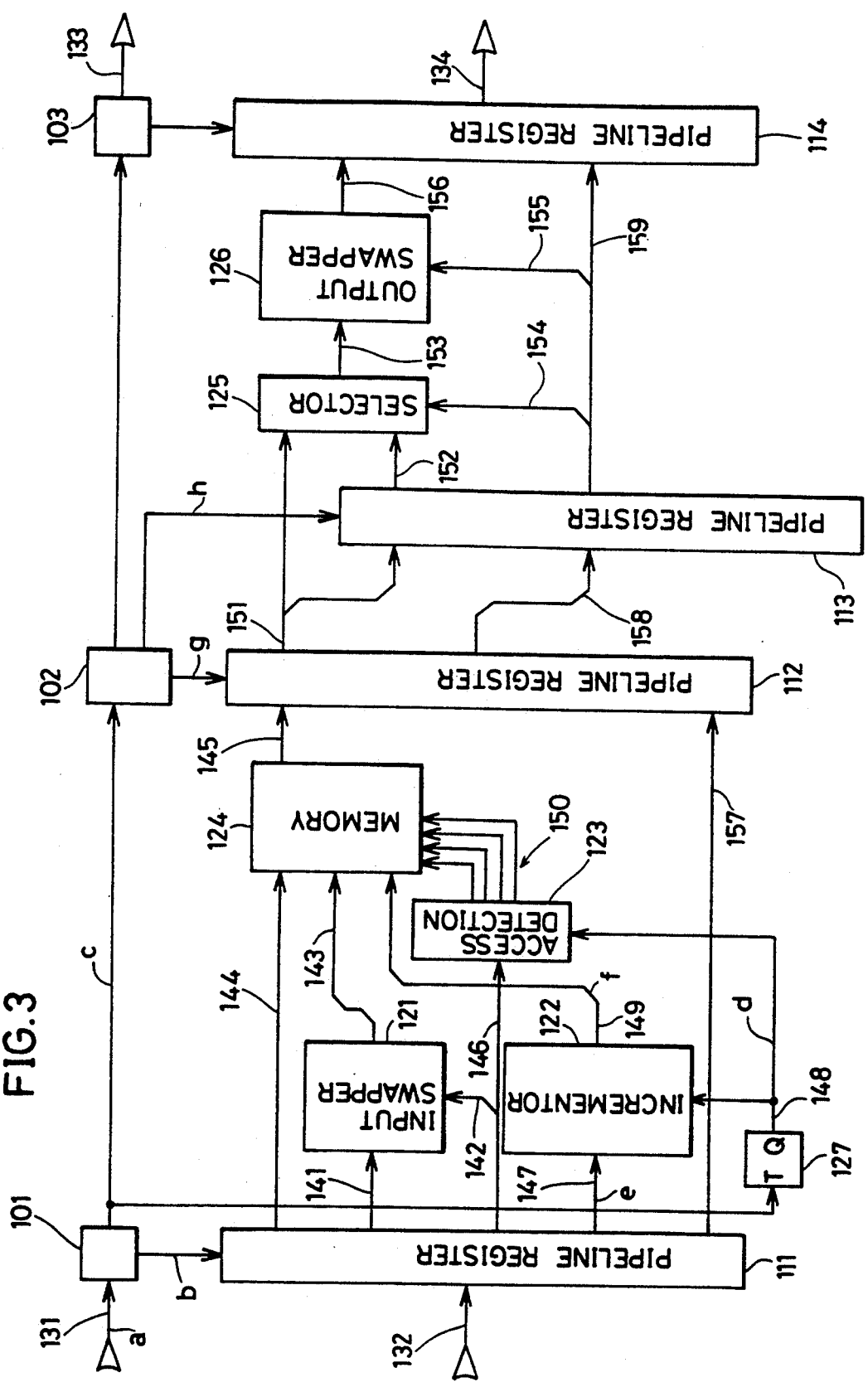
FIG. 3 is a schematic block diagram of an embodiment of the present invention.

FIG. 3 is a block diagram of an embodiment of the present invention. In this embodiment, the data line width is 32 bits, the address unit is 8 bits (byte), and the three handled data types are data of 8 bits in width (byte data), 16 bits in width (word), and a 32 bits in width (long-word).

Referring to FIG. 3, a copy control circuit 101 is connected to a pulse input line 131 to control the propagation of the pulse signal and the copy. When a pulse signal is applied to copy control circuit 101, this copy control circuit applies a write pulse signal to pipeline register 111 immediately, and two pulse signals in succession to a branch control circuit 102 after a predetermined time of delay. The interval of the two pulses are selected so as to be longer than the above mentioned delay time. The branch control circuit 102 controls the propagation of the pulse and the branching. When a pulse signal is applied to branch control circuit 102, a write pulse signal is immediately applied to pipeline register 112. A pulse signal is applied after a predetermined time of delay to the corresponding succeeding stage in response to whether the pulse signal from copy control circuit 101 is in an odd number order or in an even number order. That is to say, if the pulse signal in an odd number order, a pulse signal is applied to pipeline register 113, and if the pulse signal in an even number order, a pulse signal is applied to transfer control circuit 103.

When transfer control circuit 103 receives a pulse signal, transfer control circuit 103 applies a write pulse signal to pipeline register 114 immediately, and a pulse signal to pulse output line 133 after a predetermined time of delay. When each of pipeline registers 111, 112, 113, and 114 receives a write pulse signal, the data provided on each input line is fetched and held, while output at the same time. A packet input line 132 is connected to pipeline register 111. The read/write flag output from pipeline register 111 is applied to memory 124 via read/write flag line 144. The write data provided from pipeline register 111 is applied to an input stage 32-bit input swapper 121 via input data line 141. The less significant two bits of the address signal provided from pipeline register 111 is applied as a control signal via a less significant address line 142 to input swapper 121. The input swapper 121 circulates the input data of 32 bits in width applied from input data line 141 in 8-bit unit, in response to the less significant two bits of the address signal applied from less significant address line 142.

Figures 4, 5:
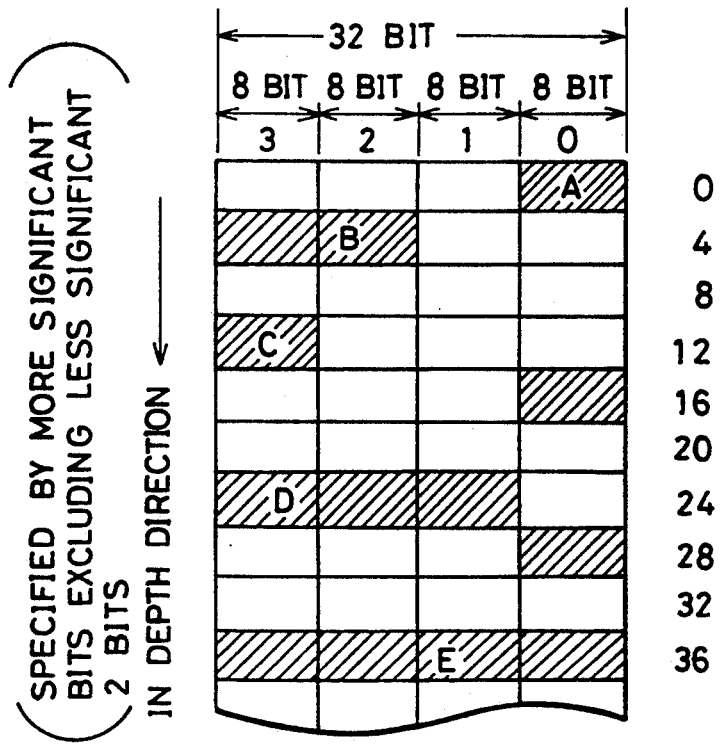
FIG. 4 is a diagram for explaining the operation of the input swapper of FIG. 3.
FIG. 5 is a diagram showing an example of the allocation of data of three data types in a memory space of 32 bits width.

When the value of the less significant two bits of the address signal is "0", "1", "2", or "3", each is circulated leftwards by 0 bits, 8 bits, 16 bits or 24 bits, respectively, as shown in FIG. 4. Each D1-D4 is data of 8 bits in width forming the write data of 32 bits in width.

The write data circulated by input swapper 121 is applied to memory 124 via write data line 143. The more significant bits of the address signal excluding the less significant two bits provided from pipeline register 111 is applied to an address adder (incrementor) 122 via a more significant address line 147. This incrementor 122 adds "4" to the address value of either of the copied two packets. In this embodiment, "4" is added to the packet later in time sequence of the two packets. A pulse signal identical to that applied to branch control circuit 102 from copy control circuit 101 is applied to a T flipflop 127. The output signal of T flipflop 127 is applied to incrementor 122 as a packet identification flag via a packet identification line 148. Incrementor 122 carries out the aforementioned processing in response to the packet identification flag showing that the packet is the former or the later.

A parallel bit train propagated in synchronism with a pulse signal is called a packet comprising data, an address signal, a read/write flag, and a flag showing the data type for memory access. Regarding the two packets, the packet not having the address value stored is called the first packet, whereas the packet having "4" added to the address value is called the second packet.

The more significant address provided from incrementor 122 is applied to memory 124 via more significant address line 149. The less significant 2 bits of the address signal and the flag showing the data type provided from pipeline register 111 are applied to access detector 123 via access line 146. This access detector 123 receives a packet identification flag via packet identification line 148 from T flipflop 127. Access detector 123 detects whether memory 124 is to be accessed or not regarding each 8 bits in the input data of 32 bits in width provided from read data line 143, in response to the values of the less significant 2 bits of the address signal, the flag showing the data type, and the value of the packet identification flag. Each access signal is applied to memory 124 via four chip enable lines 150.

FIG. 5 is a diagram showing data of three data types allocated in a memory space of 32 bits in width. Referring to FIG. 5, the access detector 123 shown in FIG. 3 is described more specifically. Four cells positioned horizontally each having a width of 8 bits implement a 32-bit wide long-word that can be read/written simultaneously in 1 memory access. The cells are referred to as the 0th byte, the 1st byte, the 2nd byte, and the 3rd byte from the right side. Each long-word is positioned in response to the more significant address excluding the less significant 2 bits in the direction of depth of the memory (downwards in FIG. 5). Data A is a byte data, with the address 0. Data B is a word, with the address 6. Data C is a word, with the address 15. Data D is a long-word, with the address 25. Data E is a long-word, with the address 36.

The operation of access detector 123 will be explained hereinafter taking data C as an example. The value of the address of the first packet excluding the less significant 2 bits (when 0) is 12, whereas the address of the second packet has value 4 added by incrementor 122 to become 16. Regarding the first packet, access detector 123 provides detection so as to allow access of only the 3rd byte, whereas detection is provided to allow the access of only the 0th byte regarding the second packet. The permission/refusal of the 0th byte to the 3rd byte is determined in advance by the identification of the first or second packet, the data type, and the value of the less significant 2 bits of the address signal. The identification of the first or second packet is carried out by the value of the packet identification flag.

A portion of the packet provided from pipeline register 111 that does not have its content changed by memory access is applied to pipeline register 112 via a packet transfer line 157.

The data read out from memory 124 is applied to pipeline register 112 via read data line 145. Memory 124 is implemented as a memory of 32 bits in width with four memories of 1 byte in width positioned in a horizontal direction. The position in the direction of depth of the memory space is specified by the value of the more significant bits of the address signal excluding the less significant 2 bits provided from more significant address line 149. The access of each byte in the horizontal direction is specified by the access signal applied from the four chip enable lines 150. When the read/write flag applied from read/write flag line 144 is set to a write value, the corresponding byte data on the write data line 143 is written, and when the read/write flag is set to a read value, data is read out to read data line 145, regarding the byte being accessed.

Regarding the byte that does not have access allowed by the chip enable line 150 at the time of read out, function may be implemented so as to provide an initial value data to read data line 145.

Data provided from pipeline register 112 is applied to pipeline register 113 and selector 125 via data line 151. The portion of the packet provided from pipeline register 112 excluding data is applied to pipeline register 113 via packet transfer line 158. Data provided from pipeline register 113 is applied to selector 125 via data line 152. The less significant 2 bits of the address signal provided from pipeline register 113 is applied to selector 125 as a control signal via less significant address line 154. Selector 125 implements one valid long-word from a long-word of the first packet provided from pipeline register 113 and a long-word of the second packet provided from pipeline register 112.

The operation thereof will be described hereinafter taking data C of FIG. 5 as an example. There is a value of the long-word of address 12 in the long-word of the first packet, and a value of the long-word of address 16 in the long-word of the second packet. Selector 125 selects the long-word of the first packet as the 3rd byte, and the long-word of the second packet as the 0th byte to the 2nd byte, to synthesize 1 long-word. This selection is determined by the value of the less significant 2 bits of the address signal provided from less significant address line 154. There may be a function to initialize each bit value of the 1st and 2nd bytes which are meaningless regions. In this case, the signal indicating the data type must be also applied to selector 125 as a control signal. Which byte is to be initialized is determined by the less significant 2 bits of the address signal and the data type.

The long-word synthesized at selector 125 is applied to the output stage 32-bit output swapper 126 via data line 153. The less significant 2 bits of the address signal provided from pipeline register 113 is applied to output swapper 126 as a control signal via less significant address line 155. Output swapper 126 circulates the input data of 32 bits in width provided from data line 153 in 8-bit unit in response to the less significant 2 bits of the address signal. When the value of the less significant 2 bits of the address signal is "0", "1", "2", or "3", each is circulated rightwards by 0 bits, 8 bits, 16 bits, or 24 bits, respectively. This is an operation opposite to the above mentioned input swapper 121.

A function may be implemented so as to initialize each byte value of the 1st byte to the 3rd byte and the 2nd byte to the 3rd byte regarding the data types of byte data and word data after the data is circulated. The data circulated by output swapper 126 is applied to pipeline register 114 via output data line 156. The portion of the packet output from pipeline register 113 excluding the data is provided to pipeline register 114 via packet transfer line 159. A packet output line 134 is connected to pipeline register 114.

FIGS. 6A, 6B, 6C, 6D and 6E are diagrams for explaining the operation of reading/writing data into an arbitrary address in accordance with an embodiment of the present invention, while FIG. 7 is a timing chart for explaining the operation of an embodiment of the present invention.

The operation of the system will be explained hereinafter. Although data C of FIG. 5 is taken as an example, similar operation is carried out with byte data, word, and long-word in other arbitrary positions. The write operation is first explained. A packet having the read/write flag set to a write value, the flag showing the data type set to a word value, the address value of the address signal set to 15 (more significant address 12 and less significant address 3) is provided to packet input line 132. 32 bits are prepared for the field of data of packet input line 132. Although data C of 16 bits in width can be allocated to any bit field essentially, it is presumed to be located in the region of the less significant 2 bits in this system.

Figure 6A:
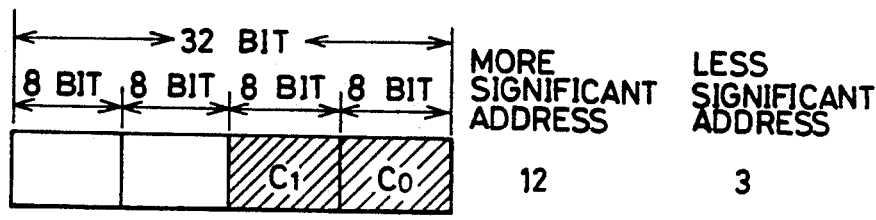
FIG. 6A shows a portion of the output of the pipeline register 111 of FIG. 3.

When a pulse signal is applied to pulse input line 131 as shown in FIG. 7 (a), a write pulse is applied to pipeline register 111 from copy control circuit 101, as shown in FIG. 7 (b). The contents of the packet provided from packet input line 132 is held in pipeline register 111, where the contents thereof is output. FIG. 6A shows the value of the 32-bit wide data field of the output of pipeline register 111 at this time. C0 and C1 are the less significant byte and the more significant byte of data C, respectively.

The packet identification flag provided from T flip-flop 127 shows the first packet as in FIG. 7 (d) at this time, whereby the output of pipeline register 111 is handled as the first packet. Accordingly, incrementor 122 does not add a value to the more significant address provided from pipeline register 111 via more significant address line 147 as shown in FIG. 7 (e), and provides a more significant address value of 12 to memory 124 via more significant address line 149, as shown in FIG. 7 (f).

The input swapper 121 circulates the input data of 32 bits in width provided from input data line 141 in the leftward direction by 24 bits in response to the less significant address value of 3. This circulated write data is applied to memory 124 via write data line 143.

Writing operation is instructed to memory 124 by a write flag from read/write flag line 144. In response to the less significant 2 bits of the address signal and the flag showing the data type provided from access line 146, and the packet identification flag provided from packet identification line 148, the access signal generated at access detector 123 is applied to memory 124 via chip enable line 150 to allow access of only the 3rd byte.

Figure 6B:
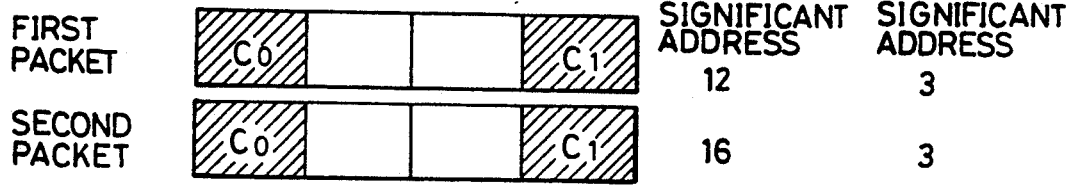
FIG. 6B shows a state where the C0 data of a first packet is written only in the third byte in a long word of the address 12 of FIG. 6A.

Memory 124 carries out write operation by writing C0 data of the first packet to only the 3rd byte in the long-word of address 12, as shown in FIG. 6B. After a predetermined time of delay, the first pulse signal is applied to branch control circuit 102 from copy control circuit 101 as shown in FIG. 7 (c), to provide a write pulse signal shown in FIG. 7 (g) to pipeline register 112 from branch control circuit 102, whereby the contents of the first packet is held in pipeline register 112 as shown in FIG. 7 (k), and the contents thereof output.

Figure 6C:
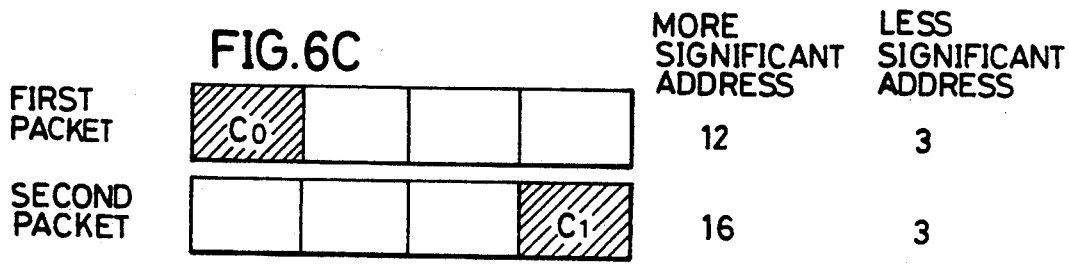
FIG. 6C is a diagram partially showing a first and second packet.

Simultaneously, T flipflop 127 is triggered by the first pulse signal provided from copy control circuit 101, whereby the output of pipeline register 111 is handled as the second packet, as shown by the value of the packet identification flag of FIG. 7 (d). Accordingly, incrementor 122 adds "4" to the more significant address provided from more significant address line 147, as shown in FIG. 7 (e), to apply a more significant address value of 16 to memory 124 via more significant address line 149, as shown in FIG. 7 (f). Access of only the 0th byte is allowed by access detector 123. This causes memory 124 to carry out write operation again, whereby C1 data is written into the 0th byte in the long-word of address 16 in the second packet of FIG. 6B. At this time point, the contents of the first packet are the output of pipeline register 112, whereas the contents of the second packet are the input thereof. FIG. 6C shows the data field of the first packet and the second packet.

After a predetermined time of delay from the time point when the first write pulse signal is applied to pipeline register 112, a write pulse signal is applied to pipeline register 113 from branch control circuit 102, as shown in FIG. 7 (h). Then, the contents of the first packet are held in pipeline register 113, as shown in FIG. 7 (l), and output. Afterwards, a second pulse signal is applied to branch control circuit 102 from copy control circuit 101, as shown in FIG. 7 (c), to provide a write pulse signal to pipeline register 112 from branch control circuit 102, as shown in FIG. 7 (g). The contents of the second packet are held in pipeline register 112, as shown in FIG. 7 (k), and output.

Simultaneously, T flipflop 127 is triggered by the second pulse provided from copy control circuit 101, whereby the value of the packet identification flag returns to the state identifying the first packet, as shown in FIG. 7 (d). Because the output of pipeline register 113 is the contents of the first packet at this time as shown in FIG. 7 (l), the value of the long-word in the first packet is output to data line 152. Also, because the output of pipeline register 112 is the contents of the second packet as shown in FIG. 7 (k), the value of the long-word in the second packet is output to data line 151.

Figure 6D:
FIG. 6D shows a long word.

Selector 125 is responsive to the less significant 2 bits value of 3 of the address signal applied from less significant address line 154 to select the 0th byte to the 2nd byte of the long-word data in the second packet, and the 3rd byte of the long-word data in the first packet to generate 1 long-word. FIG. 6D shows the generated long-word.

Figure 6E:
FIG. 6E shows data as provided from the data output line 156 of FIG. 3.

The output swapper 126 is responsive to the less significant 2 bits value of 3 of the address value provided from less significant address line 155 to circulate data provided from data line 153 in the rightwards direction by 24 bits to output the same to data line 156. FIG. 6E shows the data provided from selector 125 to output data line 156 through output swapper 126. After a predetermined time of delay from the time point when the second write pulse signal is applied to pipeline register 112, a pulse signal shown in FIG. 7 (i) is applied from branch control circuit 102 to transfer control circuit 103, whereby a write pulse signal shown in FIG. 7 (j) is applied from transfer control circuit 103 to pipeline register 114. Pipeline register 114 holds the long-word data provided from output data line 156 and a portion of the content of the first packet provided from pipeline register 113, and outputs the same to packet output line 134, as shown in FIG. 7 (m). After a predetermined time of delay, a pulse signal is provided to pulse output line 133 from transfer control circuit 103, whereby the serial write operation is ended.

Next, the read operation is described. Similarly to the above mentioned write operation, data C of the word of address 15 is taken as an example for reading. A packet having the read/write flag set to a read value, the flag showing the data type set to a word value, and the address value of the address signal set to 15 is applied to packet input line 132. When a pulse signal is applied to pulse input line 131, an operation similar of the above mentioned writing operation is carried out, whereby the contents of the first packet are applied to memory 124 via signal lines 144, 143, 149 and 150. At this point, the read/write flag provided from read/write flag line 144 shows a read value, the value of the more significant address from more significant line 149 is 12, and the access signal provided from chip enable line 150 allows the access of only the 3rd byte. In response, the long-word of address 12 including C0 data is read from memory 124 and output to read data line 145. The first packet including the read out long-word is transferred to pipeline register 113 via pipeline register 112.

An operation similar to that of write operation is carried out, where the contents of the second packet are applied to memory 124 via signal lines 144, 143, 149, and 150 to carry out read operation in memory 124. A long-word of address 16 including C1 data is read out and provided to read data line 145. The contents of the second packet including the read out long-word are held in pipeline register 112. At this time point, the contents of the first packet including the long-word data shown in FIG. 6C is held in pipeline register 113, and the contents of the second packet are held in pipeline register 112. Then, the output packet including the long-word data shown in FIG. 6E is provided to packet output line 134. Thus, the serial read operation is ended.

In accordance with an embodiment of the present invention, four different types of data of 8 bits in width, 16 bits in width, 24 bits in width, and 32 bits in width can be read/written regarding an arbitrary address to significantly remove the limitation in usage.

Although access detector 123 is responsive to the less significant 2 bits of the address signal, the flag showing the data type, and the value of the packet identification flag in the example of FIG. 3 to allow access to one of the 0th byte to the 3rd byte, at the time of reading similar to that of at the time of writing, access may be allowed to all bytes of the 0th byte to the 3rd byte at the time of reading, regardless of the less significant 2 bits of the address signal, the flag showing the data type, and the value of the packet identification flag. This is because no inconvenience occurs in the operation of the system due to the fact that only an empty read is carried out when an unnecessary byte is accessed in reading.

Figure 8:
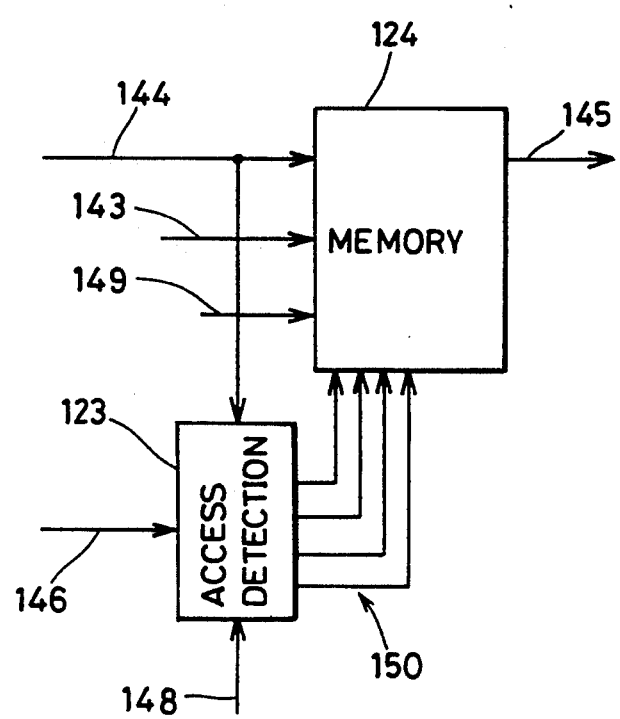
FIGS. 8, 9, and 10 are modifications of an embodiment of the present invention.

FIG. 8 is a block diagram showing a modification of the embodiment of the present invention based on the aforementioned consideration. In FIG. 8, the read/write flag from read/write flag line 144 is applied as the control signal to access detector 123 so as to alter the operation of the access detector 123 at the time of writing and at the time of reading.

Figure 9:
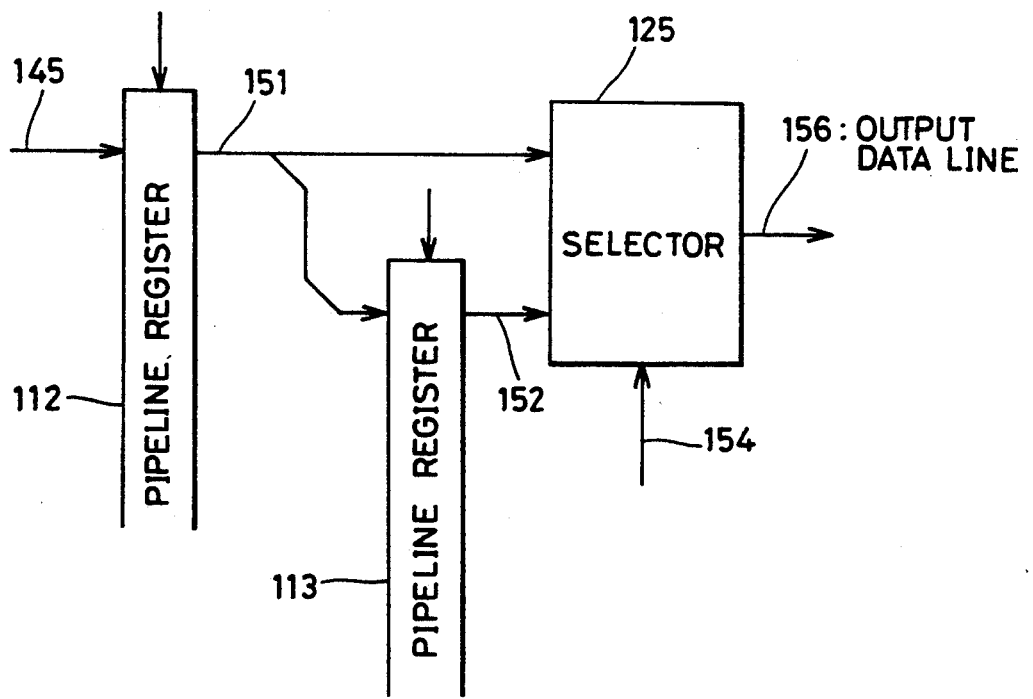

FIG. 9 is a diagram showing another modification of an embodiment of the present invention. In the embodiment of FIG. 3, an output swapper 126 is disposed at a succeeding stage of selector 125. In the example of a FIG. 9, the feature of the output swapper 126 is combined in selector 125 so that output swapper 126 is omitted. The operation of selector 125 in this case is described hereinafter. A long-word in the first packet of 32 bits in width and a long-word of the second packet of 32 bits in width which total to 64 bits are applied as data input to selector 125. The 0th byte to the 3rd byte of the long-word in the first packet are positioned at the 0th byte to the 3rd byte, respectively, whereas the 0th byte to the 3rd byte of the long-word in the second packet are positioned at the 4th byte to the 7th byte, respectively. In response to the value of "0", "1", "2", or "3" of the less significant 2 bits of the address signal applied from less significant address line 154, the values of the 0th byte to the 3rd byte, the 1st byte to the 4th byte, the 2nd byte to the 5th byte, and the 3rd byte to the 6th byte are selected and provided to output data line 156. Because the 3rd byte of the long-word in the second packet is never selected, it may be prevented from being applied to selector 125 from the beginning.

Regarding data such as A, B, and E of FIG. 5, the access of the second packet is essentially not required. However, two pulse signals are mechanically provided from copy control circuit 101 in succession to be applied to branch control circuit 102 in accordance with the structure of the embodiment shown in FIG. 3, resulting in the memory access cycle of the unnecessary second packet being inserted.

Figure 10:
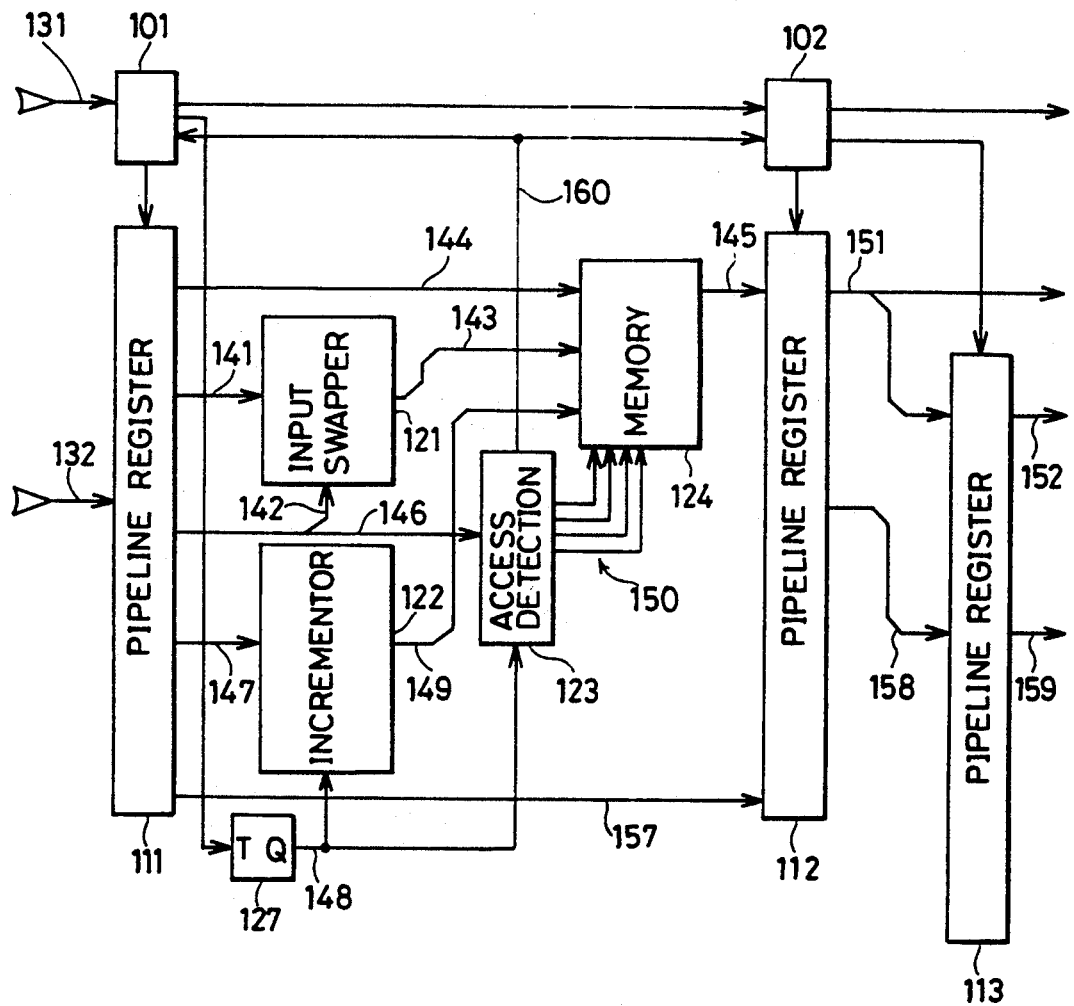

FIG. 10 is a block diagram showing a modification where the above mentioned unnecessary memory access cycle is not inserted. Referring to FIG. 10, access detector 123 is responsive to the less significant 2 bits of the address signal and the value of the flag indicating the data type provided from access line 146 to generate an access signal instructing the permission/refusal of the access of memory 124, and to generate a second access signal indicating whether the access of the second packet is necessary or not. The necessity of the access of the second packet is determined by the less significant 2 bits of the address signal and the flag showing the data type. The second access signal provided from access detector 123 is provided to copy control circuit 101 and branch control circuit 102 as a control signal via control line 160.

The copy control circuit 101 has two ways of operation in response to the value of the second access signal. In the case where access of the second packet is necessary, the supply of the pulse signal from pulse input line 131 causes a write pulse signal to be applied to pipeline register 111 immediately, and causes two pulse signals to be provided to branch control circuit 102 and T flipflop 127 in succession after a predetermined time of delay. This is an operation similar to that of the copy control circuit 101 shown in FIG. 3.

In the case where the access of the second packet is not necessary, the supply of the pulse signal from pulse input line 131 causes copy control circuit 101 to provide a write pulse signal to pipeline register 111 immediately, and one pulse signal to only branch control circuit 102 after a predetermined time of delay.

The branch control circuit 102 also has two ways of operation in response to the value of the second access signal. In the case where access of the second packet is necessary, the supply of a pulse signal to branch control circuit 102 from copy control circuit 101 causes a write pulse signal to be applied to pipeline register 112 from branch control circuit 102 immediately. When this pulse signal is in an odd number order, a pulse signal is applied to pipeline register 113 from branch control circuit 102 after a predetermined time of delay. When the pulse signal is in an even number order, a pulse signal is applied to transfer control circuit 103 from branch control circuit 102 after a predetermined time of delay. This is an operation identical to that of the branch control circuit 102 shown in FIG. 3.

In the case where the access of the second packet is not necessary, the supply of a pulse signal from copy control circuit 101 will cause branch control circuit 102 to provide a write pulse signal to pipeline register 112 immediately, and a pulse signal to pipeline register 113 after a period of time necessary for pipeline register 112 to fetch and hold the input data and output the same. After a predetermined time of delay, branch control circuit 102 provides a pulse signal to transfer control circuit 103.

In the above mentioned structure, access of the second packet is necessary regarding data C of FIG. 5 for example, and an operation similar to that shown in FIG. 3 is carried out. The access of the second packet is not necessary regarding data A, B, and E of FIG. 5, for example. When a pulse signal is applied from pulse input line 131, only one pulse signal is applied to branch control circuit 102 from copy control circuit 101, resulting in occurrence of only one memory access cycle.

Figure 11:
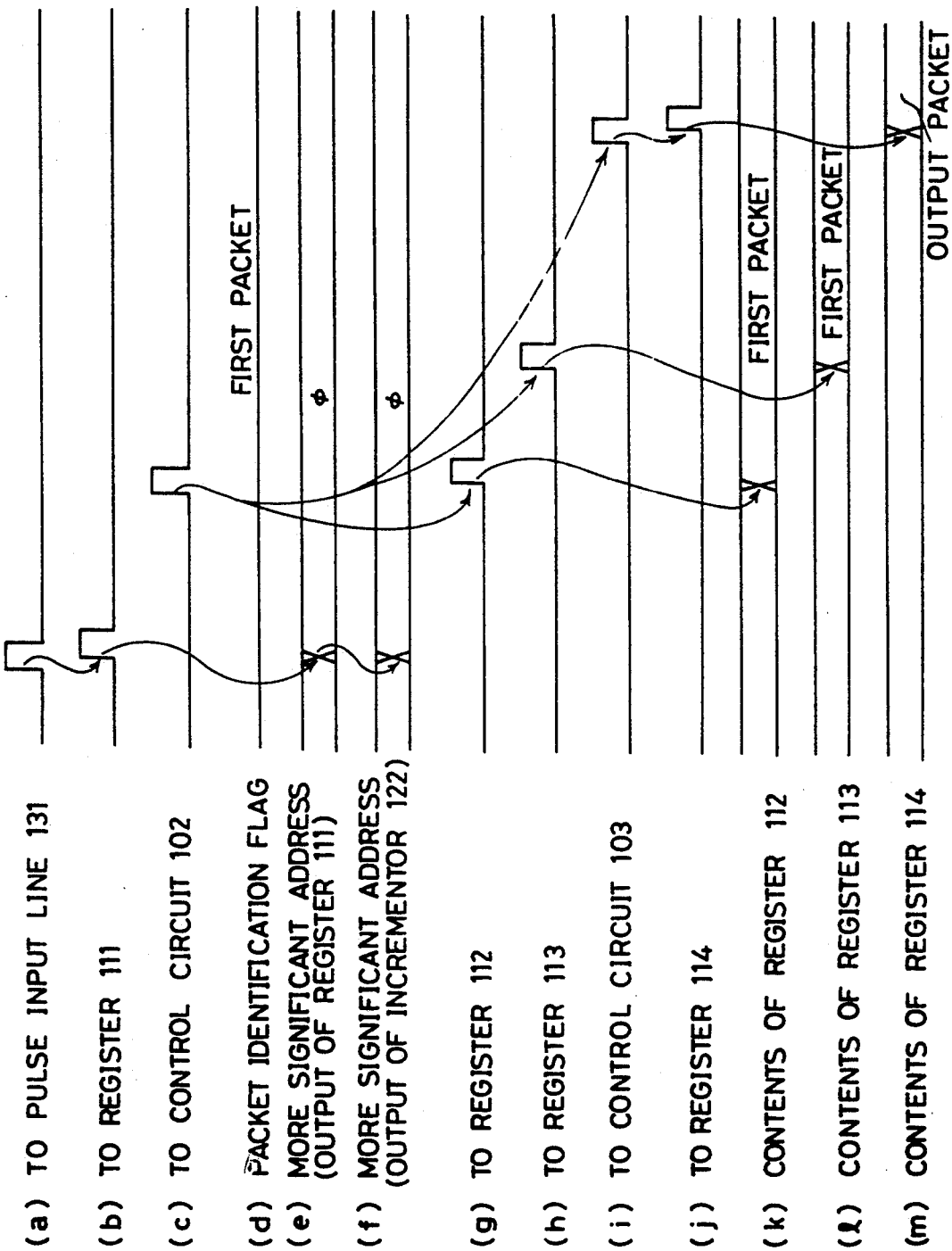
FIG. 11 is a timing chart for explaining the operation of the modification of FIG. 10.

FIG. 11 is a timing chart for explaining the operation of the modification of FIG. 10, taking data A (address 0) of FIG. 5, as an example. It is obvious from FIG. 11 that useless memory access cycles are not inserted due to the structure of FIG. 10. Accordingly, copy control circuit 101 can be quickly returned to the waiting state for the input of the next packet, leading to more packets being processed in a short time compared to that of the embodiment of FIG. 3.

Considering the order in time sequence of the packet passing memory 124, the first packet which does not have the more significant address processed passes first, followed by the second packet which has "4" added to the more significant address in the example of FIG. 3. However, a converse implementation may be established where the second packet first passes, and the first packet being passed after.

Figure 12:
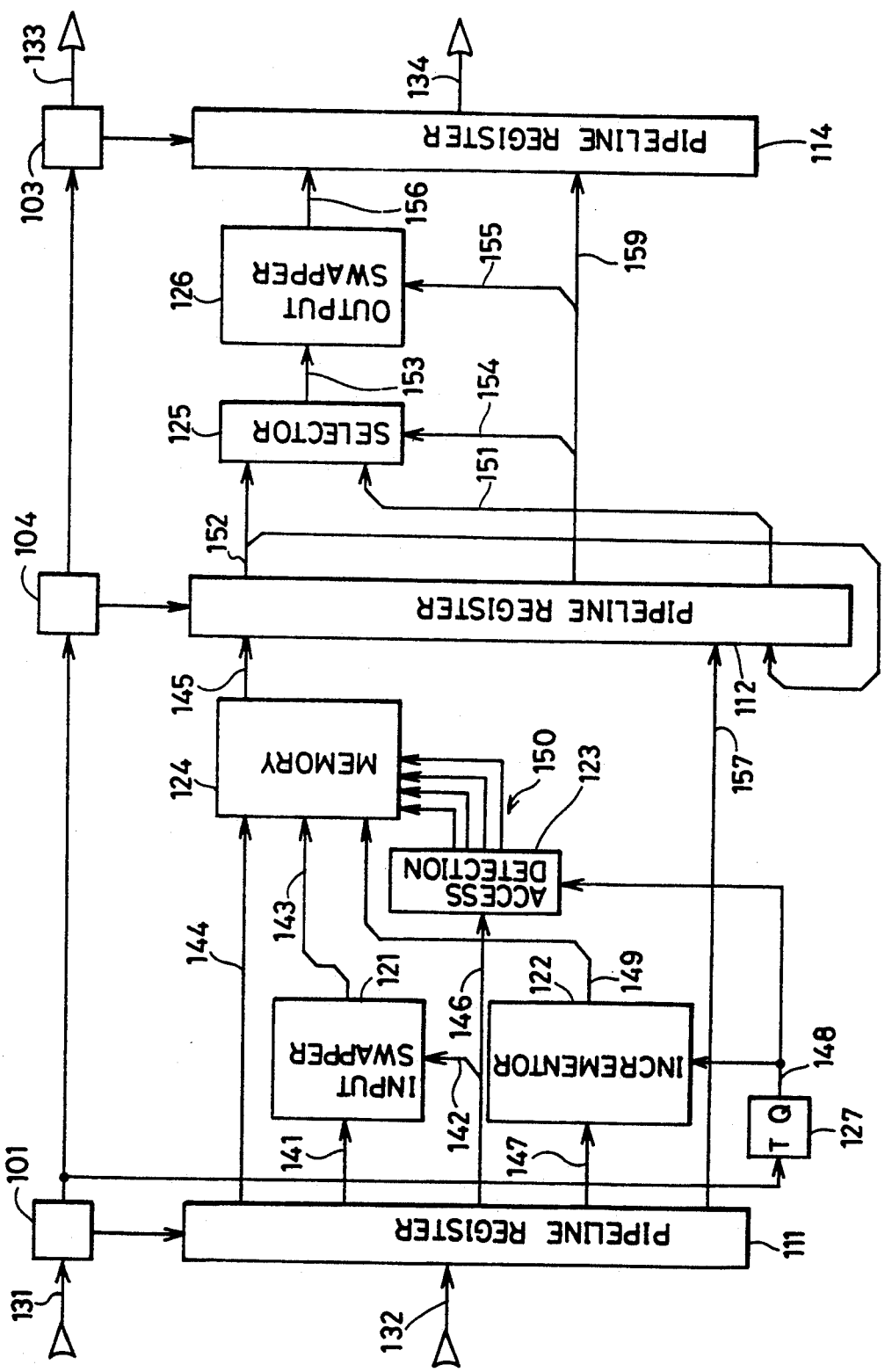
FIG. 12 is a block diagram showing another embodiment of the present invention.

FIG. 12 is a block diagram showing such an embodiment. In the embodiment of FIG. 12, the initial value of the packet identification flag will show the second packet. Incrementor 122 adds "4" to the more significant address of the preceding packet in the time sequence, and does not process the more significant address of the succeeding packet. Accordingly, the pipeline register 113 and branch control circuit 102 shown in FIG. 3 are omitted, and the data read out from memory 124 is applied to the first data input section of pipeline register 112 via read data line 145. The long-word provided from the first data output section of pipeline register 112 is applied to selector 125 via data line 152, and to the second data input section of pipeline register 112. The long-word provided from the second data output section of pipeline register 112 is applied to selector 125 via data line 151.

An erase control circuit 104 is provided for controlling pipeline register 112. A pulse signal is applied to erase control circuit 104 from copy control circuit 101. When a pulse signal is applied to erase control circuit 104, a write pulse signal is immediately applied to pipeline register 112. When the write pulse signal is in an even number order, a pulse signal is applied to transfer control circuit 103 after a predetermined time of delay. That is to say, the pulse signal in an odd number order will be erased after being applied to pipeline register 112. The other structures are similar to that of the embodiment of FIG. 3.

Figure 13:
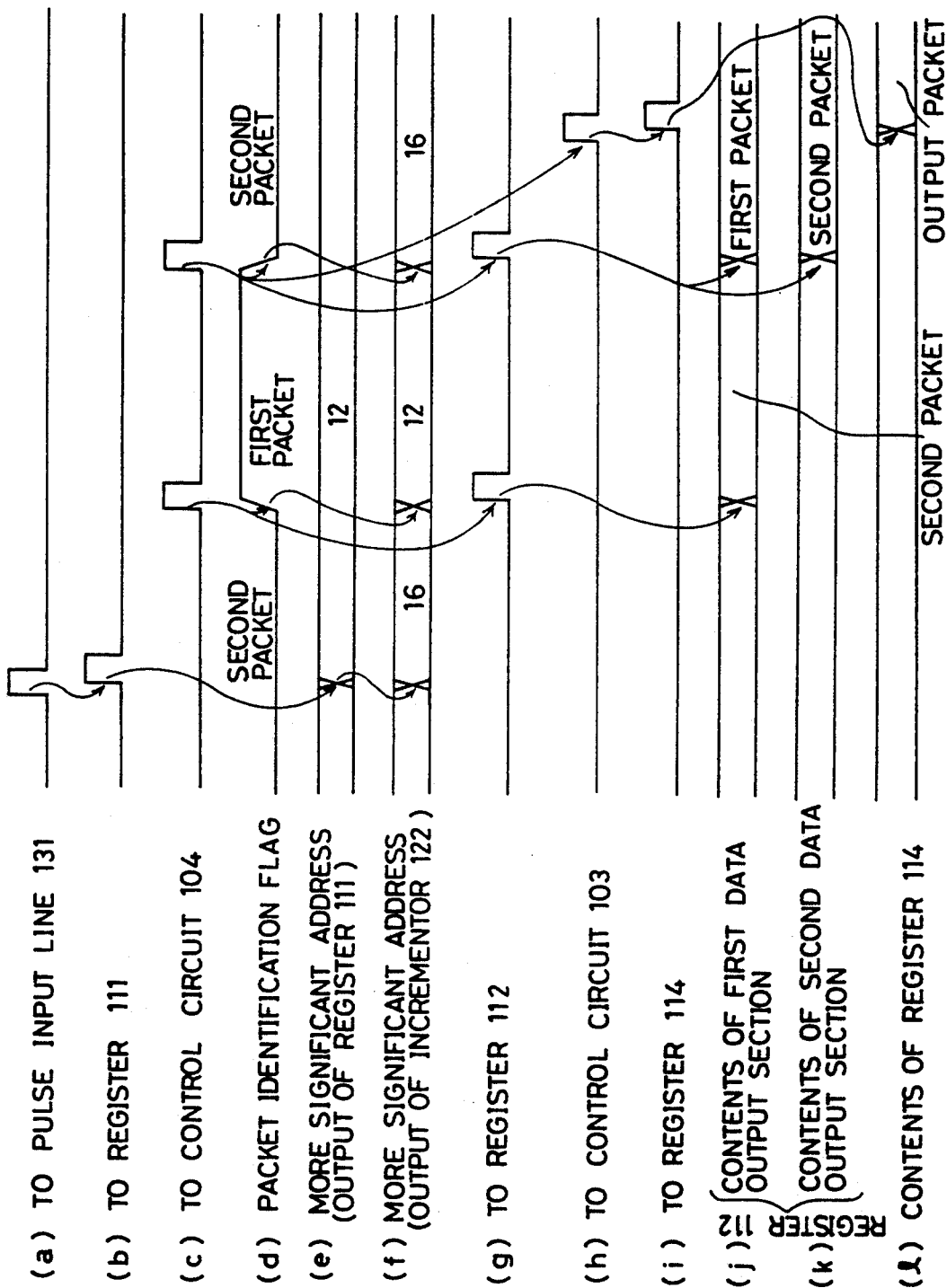
FIG. 13 is a timing chart for explaining the operation of the embodiment of FIG. 12.

FIG. 13 is a timing chart for explaining the operation of the embodiment of a FIG. 12. The operation of the embodiment of a FIG. 12 is explained hereinafter with reference to FIG. 13. Similarly to the embodiment of FIG. 3, data C of FIG. 5 will be taken as an example. However, similar operation is carried out regarding byte data, word, and long-word in other arbitrary positions. A packet having the read/write flag set to a write value, the flag showing the data type set to a word value, and the address signal set to an address value of 15 is applied to packet input line 132. When a pulse signal shown in FIG. 13 (a) is applied to pulse input line 131, a write pulse signal shown in FIG. 13 (b) is applied from copy control circuit 101 to pipeline register 111, wherein the contents of the packet applied from packet input line 132 are held and the contents thereof output. The data field of the output of pipeline register 111 at this time point is as shown in FIG. 6A. C0 and C1 are less significant byte and more significant byte in data C, respectively.

The packet identification flag provided from T flipflop 127 at this time point shows the second packet as in FIG. 13 (d). The output of pipeline register 111 is handled as the second packet. Accordingly, incrementor 122 adds "4" to the more significant address provided from pipeline register 111 via more significant address line 147, as shown in FIG. 13 (e), and applies the more significant address value of 16 to memory 124 via more significant address line 149, as shown in FIG. 13 (f).

The input swapper 121 is responsive to the less significant address value of 3 to circulate the input data of 32 bits in width applied from input data line 141 in a leftward direction by 24 bits. The circulated write data is applied to memory 124 via write data line 143. Writing operation is instructed to memory 124 by the read/write flag provided from read/write flag line 144. In response to the less significant 2 bits of the address signal and the flag showing the data type provided from access line 146, and the packet identification flag provided from packet identification line 148, the access signal generated in access detector 123 is applied to memory 124 via chip enable line 150 to allow access of the 0th byte.

This causes the write operation of memory 124 to write C1 data of the second packet shown in FIG. 6B to only the 0th byte in the long-word of address 16. After a predetermined time of delay, a first pulse signal as shown in FIG. 13 (c) is applied to erase control circuit 104 from copy control circuit 101 to provide a write pulse signal shown in FIG. 13 (g) to pipeline register 112 from erase control circuit 104. Accordingly, the long-word value of the second packet as shown in FIG. 13 (j) is provided to the first data output section of pipeline register 112.

Simultaneously, T flipflop 127 is triggered by the first pulse signal provided from copy control circuit 101, whereby the value of the packet identification flag shows the first packet as in FIG. 13 (d). The output of pipeline register 111 is handled as the first packet. Accordingly, incrementor 122 does not process the more significant address of FIG. 13 (e) provided via more significant address line 147, and the more significant address value of 12 is applied to memory 124 as shown in FIG. 13 (f) via more significant address line 149. Only the access of the 3rd byte is allowed by access detector 123. This causes the write operation of memory 124 again to write C0 data of the first packet shown in FIG. 6B into only the 3rd byte of the long-word of address 12. At this point, the contents of the second packet are the output of pipeline register 112, and the contents of the first packet are the input thereof. FIG. 6C shows the data field of the first packet and the second packet.

Then, a second pulse signal is applied to erase control circuit 104 from copy control circuit 101 as shown in FIG. 13 (c), to provide a write pulse signal shown in FIG. 13 (g) to pipeline register 112 from erase control circuit 104. Therefore, the long-word data value of the first packet as shown in FIG. 13 (j) is provided to the first data output section of pipeline register 112, whereas the long-word data value in the second packet is provided to the second data output section as shown in FIG. 13 (k). Simultaneously, T flipflop 127 is triggered by the second pulse signal provided from copy control circuit 101, whereby the value of the packet identification flag is returned to the state showing the second packet, as shown in FIG. 13 (d).

At this point, the output of the first data output section of pipeline register 112 is the value of the long-word data in the first packet, as shown in FIG. 13 (j), whereby the value of the long-word data in the first packet is provided to data line 152. The output of the second data output section of pipeline register 112 is the value of the long-word data of the second packet, as shown in FIG. 13 (k), and the value of the long-word of the second packet is provided to data line 151.

Selector 125 is responsive to the less significant 2 bits value of the address signal of 3 provided from less significant address line 154, to select the 0th byte to the 2nd byte of the long data in the second packet, and to select the 3rd byte of the long data of the first packet, to generate one long-word. The long-word generated at this time is as shown in FIG. 6D.

The output swapper 126 is responsive to the less significant 2 bits value of the address signal of 3 applied from less significant address line 155 to circulate data applied from data line 153 in a rightward direction by 24 bits. The circulated data is provided to output data line 156. The data provided to output data line 156 is as shown in FIG. 6E.

After a predetermined time of delay from a time point when the second write pulse signal is applied to pipeline register 112, a pulse signal as shown in FIG. 13 (h) is provided to transfer control circuit 103 from erase control circuit 104 to provide a write pulse signal shown in FIG. 13 (i) to pipeline register 114 from transfer control circuit 103. Pipeline register 114 holds the long-word data provided from output data line 156 and a portion of the contents of the first packet provided from pipeline register 112, and provides the same to packet output line 134, as shown in FIG. 13 (l). After a predetermined time of delay, a pulse signal is provided to pulse output line 133 from transfer control circuit 103, whereby the serial writing operation is ended.

Next, the reading operation will be explained. Similarly to the aforementioned writing operation, data C of the word of address 15 is taken as an example for explaining the reading operation. A packet having the read/write flag set to a read value, the flag showing the data type set to a word value, and the address value of the address signal set to 15 is applied to packet input line 132. When a pulse signal is applied to pulse input line 131, an operation similar to the above mentioned writing operation is carried out, where the contents of the second packet are applied to memory 124 via signal lines 144, 143, 149 and 150. At this point, the read/write flag provided from read/write flag line 144 is set to a read value, the more significant address value applied from more significant address line 149 is set to 16, and the access signal provided from chip enable line 150 allows access of only the 0th byte. In response, the long-word of address 16 comprising C1 data is read out from memory 124 and provided to data line 145. The second packet including the read out long-word is held in pipeline register 112.

An operation similar to the writing operation is carried out, where the contents of the first packet are applied to memory 124 via signal lines 144, 143, 149 and 150. Memory 124 carries out read operation to read out the long-word of address 12 including C0 data and provides the same to read data line 145. The contents of the first packet including the read out long-word are held in pipeline register 112.

At this point, the long-word data of the first packet as shown in FIG. 6C is provided to the first data output section of the pipeline register 112, whereas the long-word data of the second packet as shown in FIG. 6C is provided to the second data output section. Then, an output packet comprising the long-word data as shown in FIG. 6E is provided to packet output line 134, whereby the serial read operation is ended.

Similarly to the embodiment of FIG. 3, the embodiment of FIG. 12 may implement the modifications shown in FIGS. 8, 9, and 10.

In the embodiment of FIG. 12, it is necessary to provide a pulse signal to erase control circuit 104 from copy control circuit 101; after a write pulse signal is applied to pipeline register 111 from copy control circuit 101; data provided from pipeline register 111 passes input swapper 121; the more significant address of the address signal passes incrementor 122; the access of memory 124 is ended; and the read data provided to read data line 145 is determined. It is also necessary to input a pulse signal associated with the next read/write packet from pulse input line 131, after the second pulse signal is applied from copy control circuit 101 to erase control circuit 104. In other words, the time interval of sending a packet requesting memory access must be a value of more than a certain level, when seen from the input side of peripheral equipments.

Figure 14:
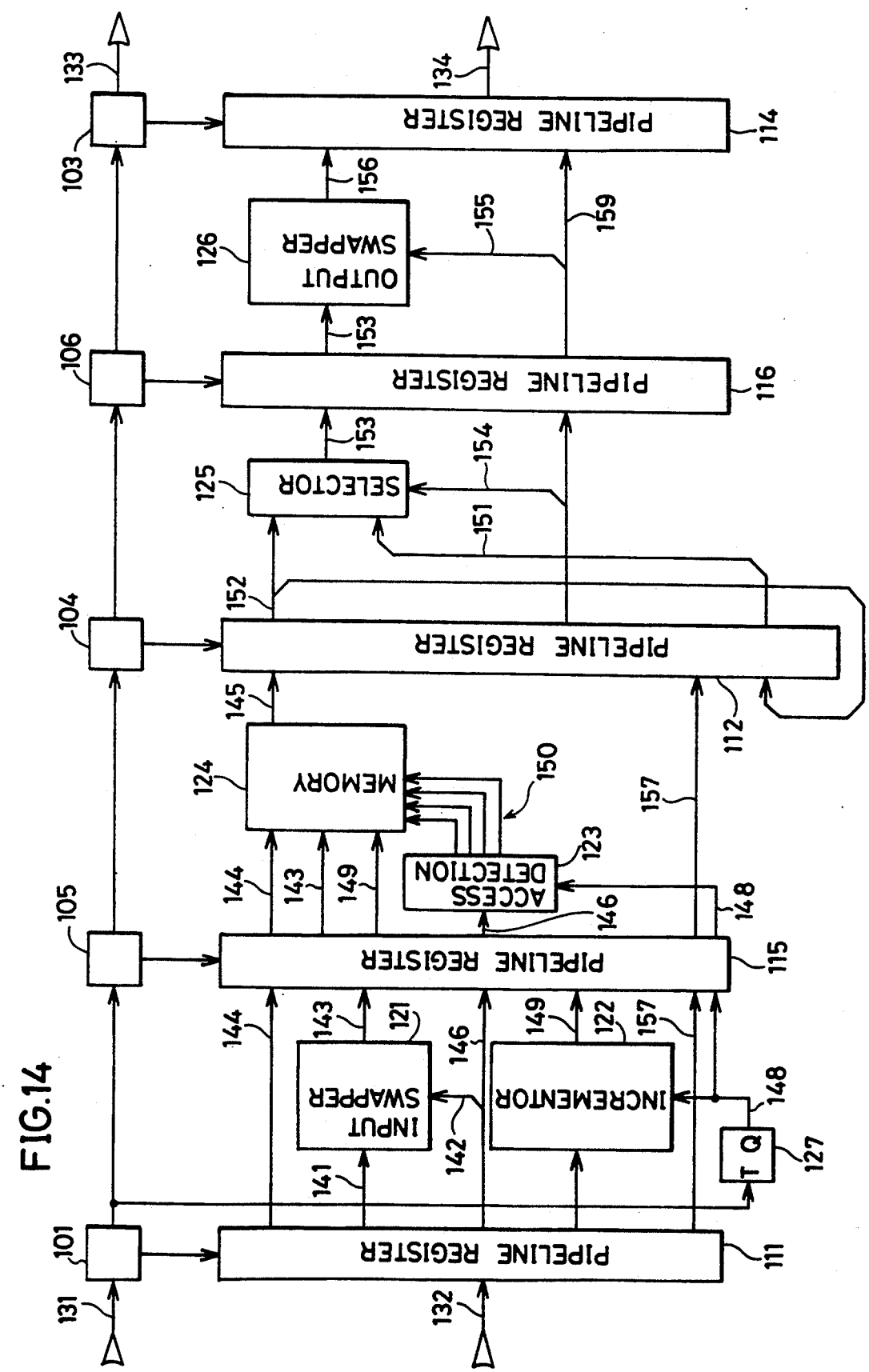
FIG. 14 is a block diagram showing a further embodiment of the present invention.

FIG. 14 is a block diagram showing a further embodiment that can reduce the time intervals of sending packets. The embodiment of a FIG. 14 is similar to that of the aforementioned FIG. 12 except for the points that will be explained hereinafter. In the succeeding stages of input swapper 121 and incrementor 122, a pipeline register 115 is provided. A pipeline register 116 is also provided in the succeeding stage of selector 125. A transfer control circuit 105 is provided in the succeeding stage of copy control circuit 101 for controlling the propagation of the pulse signals. When a pulse signal is applied to transfer control circuit 105 from copy control circuit 101, a write pulse signal is applied to pipeline register 115 immediately, and a pulse signal is applied to erase control circuit 104 after a predetermined time of delay. A transfer control circuit 106 is provided at the succeeding stage of erase control circuit 104 for controlling the propagation of the pulse signal. When a pulse signal is applied from erase control circuit 104 to transfer control circuit 106, a write pulse signal is applied to pipeline register 116 immediately, and a pulse signal is applied to transfer control circuit 103 after a predetermined time of delay. When a write pulse signal is applied to pipeline registers 115 and 116, data applied to the input line is fetched and held, while output simultaneously.

In this embodiment, the outputs such as from input swapper 121 and incrementor 122 are applied to memory 124 after being first held in pipeline register 115. Also the output of selector 125 is provided to output swapper 126 after being first held in pipeline register 116. Because the operation regarding the other memory access is identical to that of the embodiment of the aforementioned FIG. 12, the explanation will be omitted.

In accordance with the present embodiment, the outputs such as from input swapper 121 and incrementor 122 are applied to memory 124 after being held in pipeline register 115 to stabilize the output of pipeline line register 111. If the outputs of input swapper 121 and incrementor 122 are stabilized, the pulse signal can be applied to transfer control circuit 105 from copy control circuit 101 without waiting for the termination of the access of memory 124. Therefore, this embodiment will allow reducing the time interval of sending packets requesting memory access, to improve the throughput of the system.

Although the embodiment of FIG. 14 corresponds to the embodiment of the aforementioned FIG. 12, pipeline registers 115 and 116 may be implemented in the embodiment of FIG. 3.

The invention is not limited to the system of the aforementioned embodiment where data line width is 32 bits, the address unit is 8 bits, and the data type is of three types of 8 bits in width, 16 bits in width and 32 bits in width. The invention may be applied to a system where the data line width is 16 bits, the address unit is 8 bits, and the data type is of two types of 8 bits in width and 16 bits in width, for example. The invention is also applicable to a system where the data line width is 16 bits, the address unit is 4 bits, and the data type is of three types of 4 bits in width, 8 bits in width, and 16 bits in width. Furthermore, the invention is applicable to a system where the data line width is 64 bits, the address unit is 8 bits, and the data type is of four types of 8 bits in width, 16 bits in width, 32 bit, in width, and 64 bits in width.

Thus, in accordance with the embodiment of the present invention, a maximum of M types of data where the data type is in the range of N bits to $M \times N$ bits (M, N are integers) can be positioned in an arbitrary address in N-bit unit. Therefore, limitation in usage such as the data type must be in $M \times N$ bits unit, and the address must be in $N \times M$ bits unit are removed significantly. Improvement in the usage efficiency of memory can be realized owing to coexistence of a plurality of data types with different data width, and arrangement of data in density using small width type data in the address space. Ease in usage can also be realized by arbitrary positioning of data in the address space.

Figure 1:
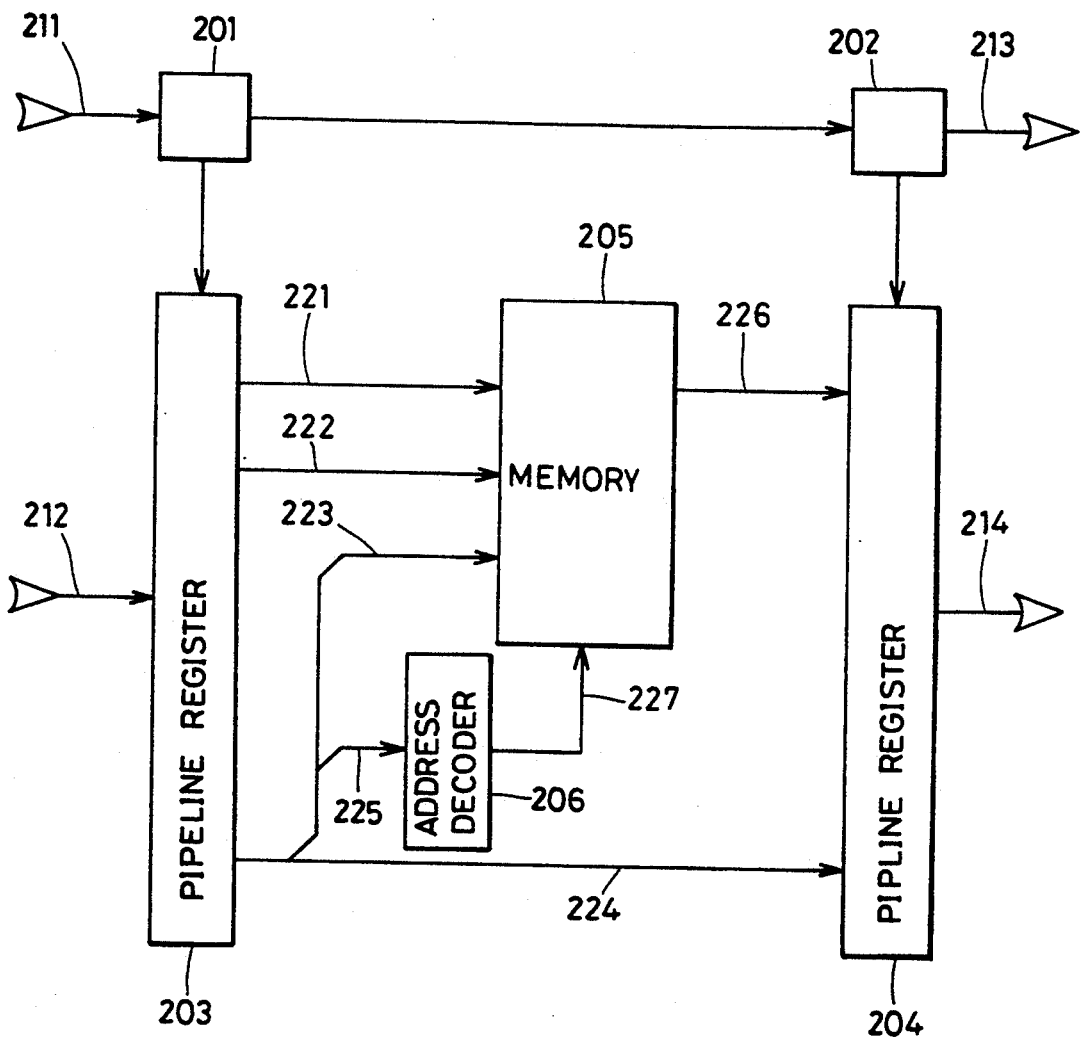
FIG. 1 is a block diagram showing an example of a conventional data sizing circuit in a data flow type system.
Figure 2:
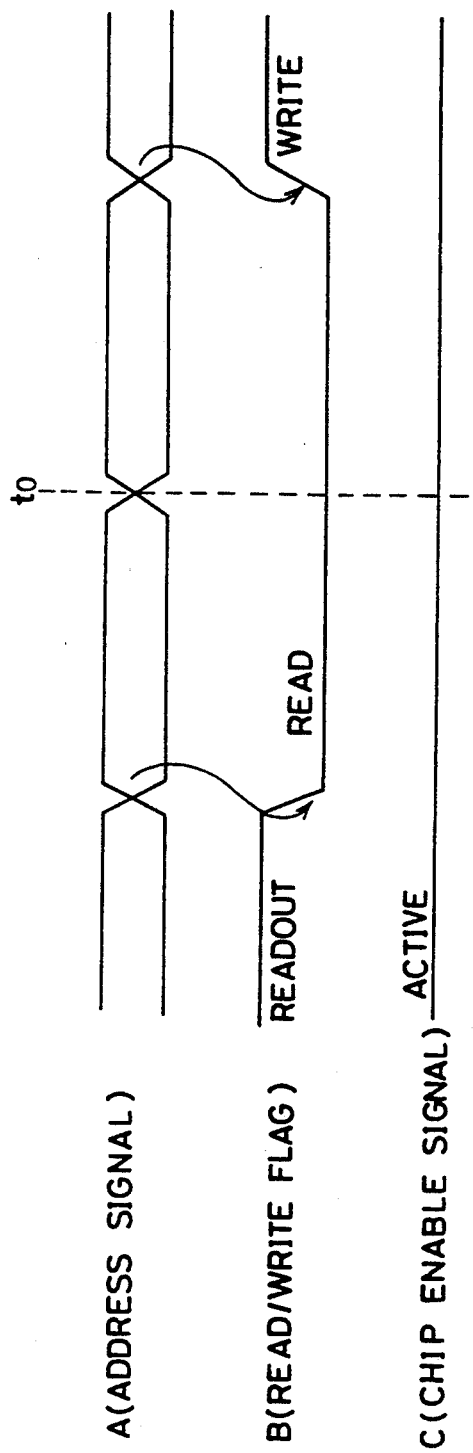
FIG. 2 is a timing chart for explaining the problems of the operation of the data sizing circuit of FIG. 1.
Figure 15:
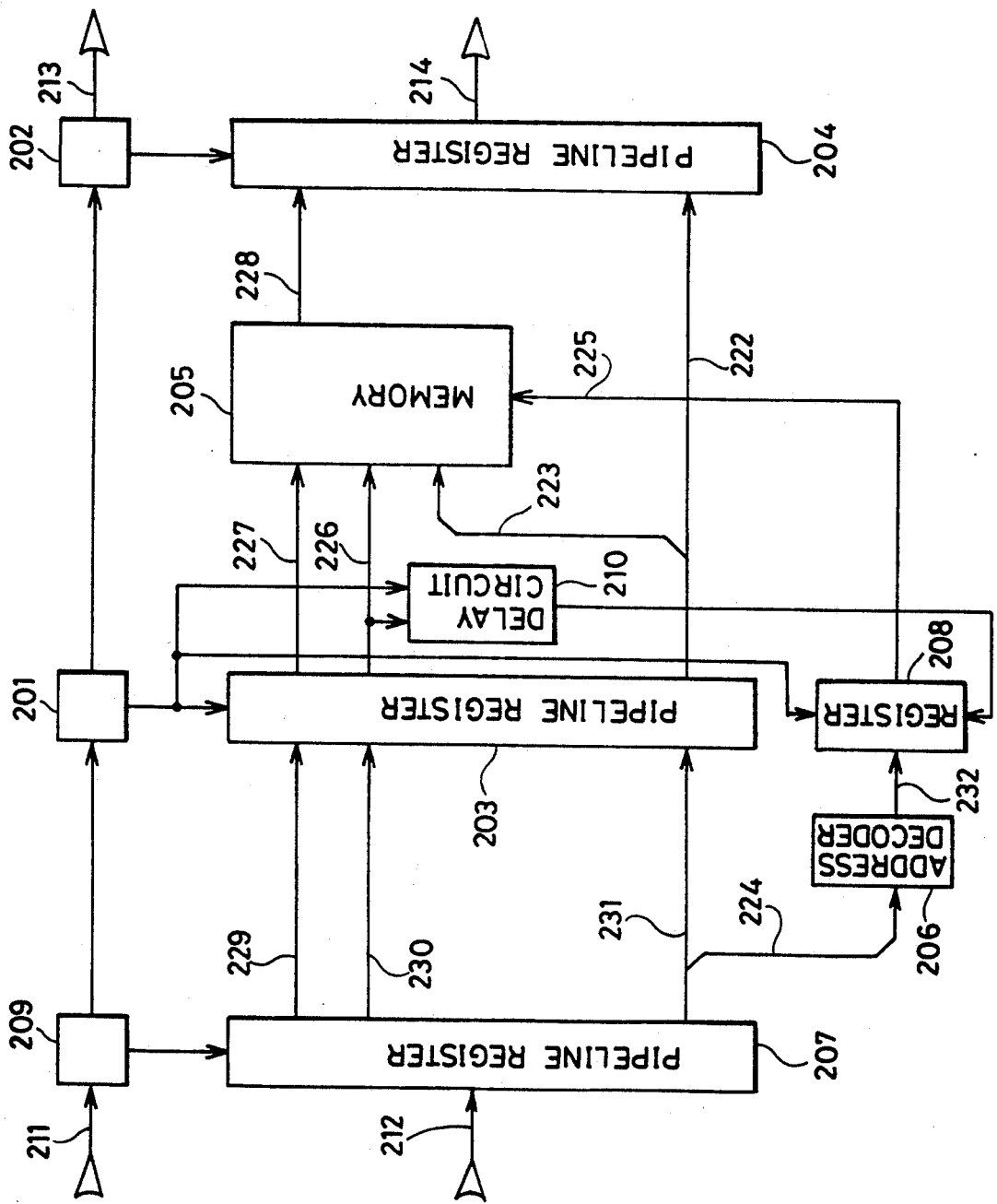
FIG. 15 is a block diagram showing a still further embodiment of the present invention.

FIG. 15 is a block diagram showing a still further embodiment of the present invention for realizing another object. The embodiment shown in FIG. 15 is provided so as to prevent erroneous writing or destruction of stored data seen in the data sizing circuit of FIG. 1. The structure thereof is similar to that of FIG. 1 except for the points described hereinafter. A pipeline register 207 is connected to packet input line 212. The write data provided from pipeline register 207 is applied to a pipeline register 203 via a write data line 229. The read/write flag provided from pipeline register 207 is applied to pipeline register 203 via read/write flag line 230. The portion of the packet including the address where the contents thereof are not changed by memory access provided from pipeline register 207 is applied to pipeline register 203 via packet transfer line 231. One portion of the address signal provided from pipeline register 207 is applied to an address decoder 206 via address line 224.

The output of address decoder 206 is applied to a register 208 via chip enable line 232. The write signal provided from transfer control circuit 201 is applied to register 208. When a write pulse signal is applied to register 208, register 208 holds the chip enable signal provided via chip enable line 232 and outputs the same simultaneously. The output of register 208 is applied to memory 205 as a chip enable signal via chip enable line 225. Pulse input line 211 is connected to transfer control circuit 209. When a pulse signal is applied to transfer control circuit 209, a write pulse signal is applied to pipeline register 207 immediately, and a pulse signal is applied to transfer control circuit 201 after a predetermined time. When pipeline register 207 receives a write pulse signal, the packet applied to packet input line 212 is held and provided simultaneously.

The write pulse signal provided from transfer control circuit 201 is applied to a delay circuit 210. The delay time of delay circuit 210 is established to be shorter than the input interval of the packet and longer than the time necessary for memory access. The read/write flag provided from pipeline register 203 is applied as a control signal to delay circuit 210. When the read/write flag shows a read value, delay circuit 210 does not output the pulse signal applied from transfer control circuit 201. When the read/write flag shows a write value, the pulse signal applied from transfer control circuit 201 is delayed and output.

The pulse signal provided from delay circuit 210 is applied to the aforementioned register 208 as the initialization pulse. When an initialization pulse is applied to register 208, the chip enable signal is initialized so as to attain a non-active state.

The read operation of the present embodiment is described hereinafter. When a packet having the read/write flag set to a read value is applied to packet input line 212 and a pulse signal is applied to pulse input line 211, a write pulse signal is applied to pipeline register 207 from transfer control circuit 209. Pipeline register 207 holds the packet applied from packet input line 212 and outputs thereof. After a predetermined time, a pulse signal is applied to transfer control circuit 201 from transfer control circuit 209.

Similar operation is carried out regarding the stages implemented by transfer control circuit 201 and pipeline register 203, whereby the packet is held in pipeline register 203 and output. After a predetermined time, a pulse signal is applied to transfer control circuit 202. At this point, the output of address decoder 206 is held in register 208 and output by the same write pulse signal to pipeline register 203.

Before a pulse signal is applied to transfer control circuit 202, the read/write flag from read/write flag line 226, the address signal from address line 223, and the write data from write data line 227 become stabilized for the packet, and the value of the chip enable signal provided from chip enable line 225 attains an active state. Memory 205 carries out read operation to read out data to read data line 228. Because the read/write flag is a read value, the write pulse signal provided to delay circuit 210 from transfer control circuit 201 is not output from delay circuit 210, and the output of register 208 is not initialized.

When a pulse signal is applied to transfer control circuit 202 from transfer control circuit 201, a write pulse signal is applied to pipeline register 204 from transfer control circuit 202. This causes pipeline register 204 to hold data applied from read data line 228 and packet transfer line 222, and provide the same to packet output line 214. After a predetermined time, a pulse signal is provided to pulse output line 213 from transfer control circuit 202. Thus, the serial read processing is carried out.

Next, the write operation of the present embodiment is described hereinafter. A packet having the read/write flag set to a write value is provided to packet input line 212, and a pulse signal is applied to pulse input line 211. A sequence of operation similar to the above mentioned read operation is carried out so that the packet is held in pipeline register 203 and output. Before a pulse signal is applied to transfer control circuit 202, the read/write flag provided from read/write flag 226, the address signal applied from address line 223, and the value of the write data provided from write data line 227 become stabilized for the packet, and the chip enable value provided from chip enable line 225 attains an active state for memory 205 to carry out write operation.

Because the read/write flag is a write value in this case, the write pulse signal applied to delay circuit 210 from transfer control circuit 201 is output from delay circuit 210 after a predetermined time. This causes the output of register 208 to be initialized to turn the chip enable signal provided to memory 205 into a non-active state, whereby memory 205 attains a non-active state. Then, data identical to that in the write data line 227 is provided to read data line 228. The operation after the application of a pulse signal to transfer control circuit 202 is similar to that of the read operation, whereby the serial write processing is carried out.

The operation of the serial write processing is explained hereinafter. The first packet is passed to the data sizing circuit of the embodiment of a FIG. 15, where serial write operation is carried out. When a pulse signal is provided to pulse output line 213, the data sizing circuit will return to a waiting state. Pipeline register 203 holds the contents of the first packet at this time, which is continuously provided to memory 205. However, the chip enable signal provided from chip enable line 225 attains a non-active state due to the initialization pulse from delay circuit 210. Accordingly, memory 205 waits at a non-active state.

A second packet is then applied to the data sizing circuit, which is a write packet with only the address signal applied to memory 205 via address line 223 differing from that of the first packet. Attention is directed to the change in the output data, where the contents of pipeline register 203 and register 208 are updated to the contents of the second packet in response to the pulse signal applied to transfer control circuit 201, and the output signal of register 208 is initialized. The read/write flag remains at the write value. The chip enable signal is turned to an active state from a non-active state when the address signal provided to memory 205 from address line 223 changes to the contents of the second packet, and then returns to a non-active state after a predetermined time.

Memory 205 is in a non-selected state during waiting because the chip enable signal is at a non-active state. When the second packet reaches pipeline register 203 and register 208, the address changes and the chip enable signal is at an active state. Memory 205 carries out write operation, and then returns to a non-selected state in accordance with the chip enable signal returning to a non-active state. This means that memory 205 does not have the address changed while in a selected state, but changes from a non-selected state to a selected state undergoing a change in address, in write operation.

Figure 16:
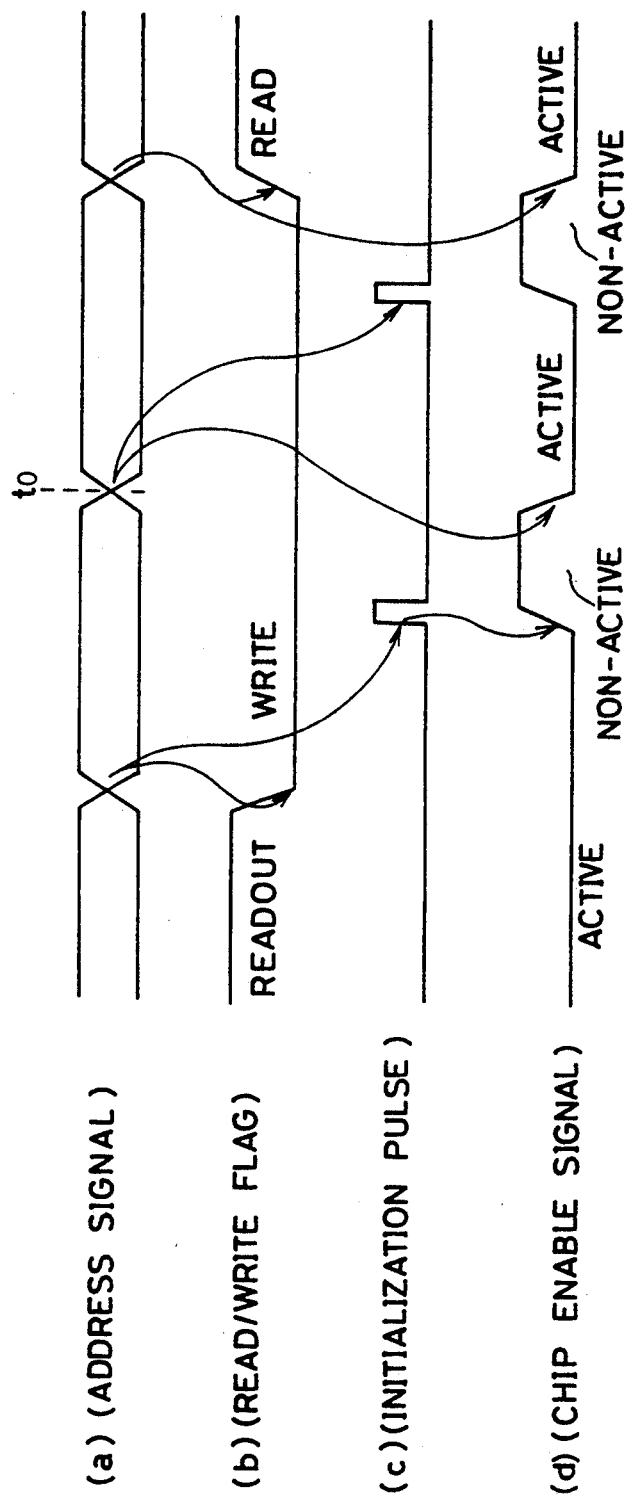
FIG. 16 is a diagram for explaining the operation of the embodiment of FIG. 15.

FIG. 16 (a) shows the address signal from address line 223; FIG. 16 (b) shows the read/write flag from read/write flag line 226; FIG. 16 (c) shows the initialization pulse provided to register 208 from delay circuit 210; and FIG. 16 (g) shows the chip enable signal from chip enable line 225. It can be seen that the chip enable signal turns to an active state from a non-active state at time point to where the address signal changes. In accordance with the present embodiment, erroneous writing and destruction of stored data due to change in address under a selected state can be avoided in write operation of memory 205 because memory 205 does not have the address changed during a selected state.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data sizing circuit in a data flow type system comprising
   means for providing a data packet, including an address signal of N-bits, data having a valid data width of M×N bits, where M is a variable integer and N is a fixed integer, an identifier indicating the valid data widths, and a read/write flag, in synchronism with a pulse signal;
   data storage means including M random access memory cells of N bits in width for storing data having a valid data width from 1×N bits to M×N bits and having an identifier corresponding to the valid width of said stored data,
   each memory cell of said storage means is N bits in width and corresponds to an address value, N memory cells being accessible simultaneously as specified by the divided result of an address value of M;
   copy means for making identical first and second copies of the data in said packet;
   adding means for adding a value M to the address value corresponding to the address in said storage means of said first copy of the data copied by said copy means, to specify an address in said storage means of the second copy of said data,
   input circulating means for circulating both copies of the M×N bits of data copied by said copy means by N-bits to apply the output to said storage means,
   access detecting means for detecting whether or not to access each of said M memory cells of said storage means, so as to enable each memory cell that is detected to be accessed, and
   synthesizing means for synthesizing the first and second copies of the data which are copied by said copy means and which are written into and read out from said storage means.

2. The data sizing circuit in a data flow type system according to claim 1, further comprising
   identification means for identifying the first and second copies of the data copied by said copy means, said adding means comprising means responsive to the identification of the first copy of the data by said identification means for accessing said storage means with the address corresponding to said first copy of the data, and responsive to the identification of the second copy of the data for adding a value M to the address value of the first copy for accessing said storage means with an address corresponding to said second copy of the data.

3. The data sizing circuit in a data flow type system according to claim 1, wherein said copy means further comprises
   register means for temporarily storing the address signal, data, and the flag included in said packet; means for providing said address signal to said adding means; means for providing said data to said input circulating means; and means for providing said flag to said storage means, and
   copy control means responsive to said pulse signal input for generating a first pulse signal to store the address signal, data, and the flag temporarily stored in said register means, and for generating second and third pulse signals to make said first and second copies of the data.

4. The data sizing circuit in a data flow type system according to claim 3, wherein said register means comprises
   first register means for temporarily storing the first data read out from said storage means,
   second register means for temporarily storing the second data read out from said storage means,
   branch control means responsive to the application of a second pulse signal from said copy control means to temporarily store the first data in said first register means, and responsive to the application of said third pulse signal to temporarily store the second data in said second register means, and
   selecting means for selecting part of each copy from the first data temporarily stored in said first register means and the second data temporarily stored in said second register means, to synthesize as an output therefrom a single copy of data.

5. The data sizing circuit in a data flow type system according to claim 4, further comprising output circulating means for circulating the data synthesized by said selecting means by N-bits in a direction opposite to that of the circulation by said input circulating means.

6. The data sizing circuit in a data flow type system according to claim 1, further comprising store means for storing a first output from said adding means and a second output from said input circulating means and providing said first and second outputs to said storage means.

7. The data sizing circuit in a data flow type system according to claim 5, further comprising store means for storing the data synthesized by said selecting means and providing said synthesized data to said output circulating means.

* * * * *

UNITED STATES PATENT AND TRADEMARK OFFICE
CERTIFICATE OF CORRECTION

PATENT NO. : 5,319,769
DATED : June 7, 1994
INVENTOR(S) : Tsuyoshi Muramatsu

It is certified that error appears in the above-indentified patent and that said Letters Patent is hereby corrected as shown below:

On the title page, Item [54], replace "POCKETS" with --PACKETS--.
Column 1, line 3, replace "POCKETS" with --PACKETS--.

Signed and Sealed this

Eighteenth Day of October, 1994

Attest:

Attesting Officer

BRUCE LEHMAN

Commissioner of Patents and Trademarks